(12) United States Patent
Kuo et al.

(10) Patent No.: US 7,227,497 B2
(45) Date of Patent: Jun. 5, 2007

(54) METHOD FOR AUTO-WRITING INTO ADDRESS BOOK

(75) Inventors: Ming-Jen Kuo, Taipei (TW); Ko-Yi Yao, Taoyuan County (TW)

(73) Assignee: Mitac International Corp., Taoyuan (TW)

( * ) Notice: Subject to any disclaimer, the term of this patent is extended or adjusted under 35 U.S.C. 154(b) by 0 days.

(21) Appl. No.: 11/164,541

(22) Filed: Nov. 29, 2005

(65) Prior Publication Data

US 2007/0001902 A1    Jan. 4, 2007

(30) Foreign Application Priority Data

Jul. 4, 2005    (TW) .............................. 94122511 A

(51) Int. Cl.
*G01S 5/02*    (2006.01)
(52) U.S. Cl. .............................. 342/357.13; 342/357.06
(58) Field of Classification Search ........... 342/357.01, 342/357.06, 357.12, 357.13; 701/208, 213
See application file for complete search history.

(56) References Cited

U.S. PATENT DOCUMENTS

2003/0202104 A1*  10/2003  Werner ................... 348/207.99
2006/0022048 A1*  2/2006   Johnson ................... 235/462.1

* cited by examiner

*Primary Examiner*—Dao Phan
(74) *Attorney, Agent, or Firm*—Jiang Chyun IP Office

(57) ABSTRACT

A method for auto-writing into an address book is provided, the method including the steps of: first, receiving a target after the navigation device being started; then judging whether there is one of a plurality of addresses in the address book being located within a predetermined range around the target; thereafter, if there is one of the addresses in the address book being located within the predetermined range around the target, displaying one of the addresses for the user confirmation; finally, writing the user-confirmed global satellite positioning coordinates of the target into the one of the addresses.

16 Claims, 2 Drawing Sheets

| Name | Address | GPS Coordinate | Phone | E-Mail |
|---|---|---|---|---|
| John | NO.187, Lake section, Taipei City | Longitude<br>Latitude | 02-26271188 | wu@mic.com.tw |

FIG. 2

| Name | Address | GPS Coordinate | Phone | E-Mail |
|---|---|---|---|---|
| John | NO.187, Lake section, Taipei City | Longitude 121.568957<br>Latitude 25.077398 | 02-26271188 | wu@mic.com.tw |

FIG. 3

METHOD FOR AUTO-WRITING INTO ADDRESS BOOK

CROSS-REFERENCE TO RELATED APPLICATION

This application claims the priority benefit of Taiwan application serial no. 94122511, filed on Jul. 4, 2005. All disclosure of the Taiwan application is incorporated herein by reference.

BACKGROUND OF THE INVENTION

1. Field of the Invention

The present invention relates to a method for auto-writing, and particularly to a method for a navigation device to auto-write the global satellite positioning coordinates of the targets into an address book after the navigation ended.

2. Description of Related Art

Global Positioning System (GPS) is a precision satellite navigation positioning system, on which U.S. Department of Defense has spent about 20 years and over 12 billion U.S. dollars since 1973 for developing. The satellite was first launched at 1978 and started all-weather routine positioning in a three-dimension space from October 1993. The development of GPS relies on the demands for supporting military affairs, space navigation and aviation. At any time, any place, if not being sheltered, a GPS user can receive signals from 4 to 8 satellites for positioning without being affected by climate.

Recently, navigation devices have become popular electronic products. Even a Personal Digital Assistant (PDA) or a smart cellular phone can be manufactured as an electronic product having a GPS device. However, the navigation software and the other functions have not been combined for current electronic products. The navigation software and the other functions of electronic products are independent parts to the users.

SUMMARY OF THE INVENTION

An object of the invention, therefore, is to provide a method for auto-writing into an address book, which can auto-writing the global satellite positioning coordinates of the targets into an address book after the navigation ended.

The present invention provides a method for auto-writing into an address book, including the steps of: first, receiving a target set by the user after the navigation device being started; then judging whether or not there is one of a plurality of addresses in the address book being located within a predetermined range around the target. Thereafter, if there is one of the addresses in the address book being located within the predetermined range around the target, the one of the addresses is displayed for the user to confirm. Then, the user-confirmed global satellite positioning coordinates of the target is written into the one of the addresses.

According to the an embodiment of the invention, if it is judged that there is no any address of the address book within a predetermined range around the target, there won't be any address to be displayed for the user to confirm.

According to the an embodiment of the invention, the aforementioned whether or not there is one of a plurality of addresses in the address book being located within a pre-determined range around the target is judged according to street names.

According to the an embodiment of the invention, the aforementioned whether there is one of a plurality of addresses in the address book being located within a pre-determined range around the target is judged further according to house numbers.

The accompanying drawings are included to provide a further understanding of the invention, and are incorporated in and constitute a part of this specification. The drawings illustrate embodiments of the invention and, together with the description, serve to explain the principles of the invention.

BRIEF DESCRIPTION OF THE DRAWINGS

FIG. 2 and FIG. 3 are diagrams for illustrating an address book of a navigation device according to an embodiment of the invention.

DESCRIPTION OF THE EMBODIMENTS

Figure 1:
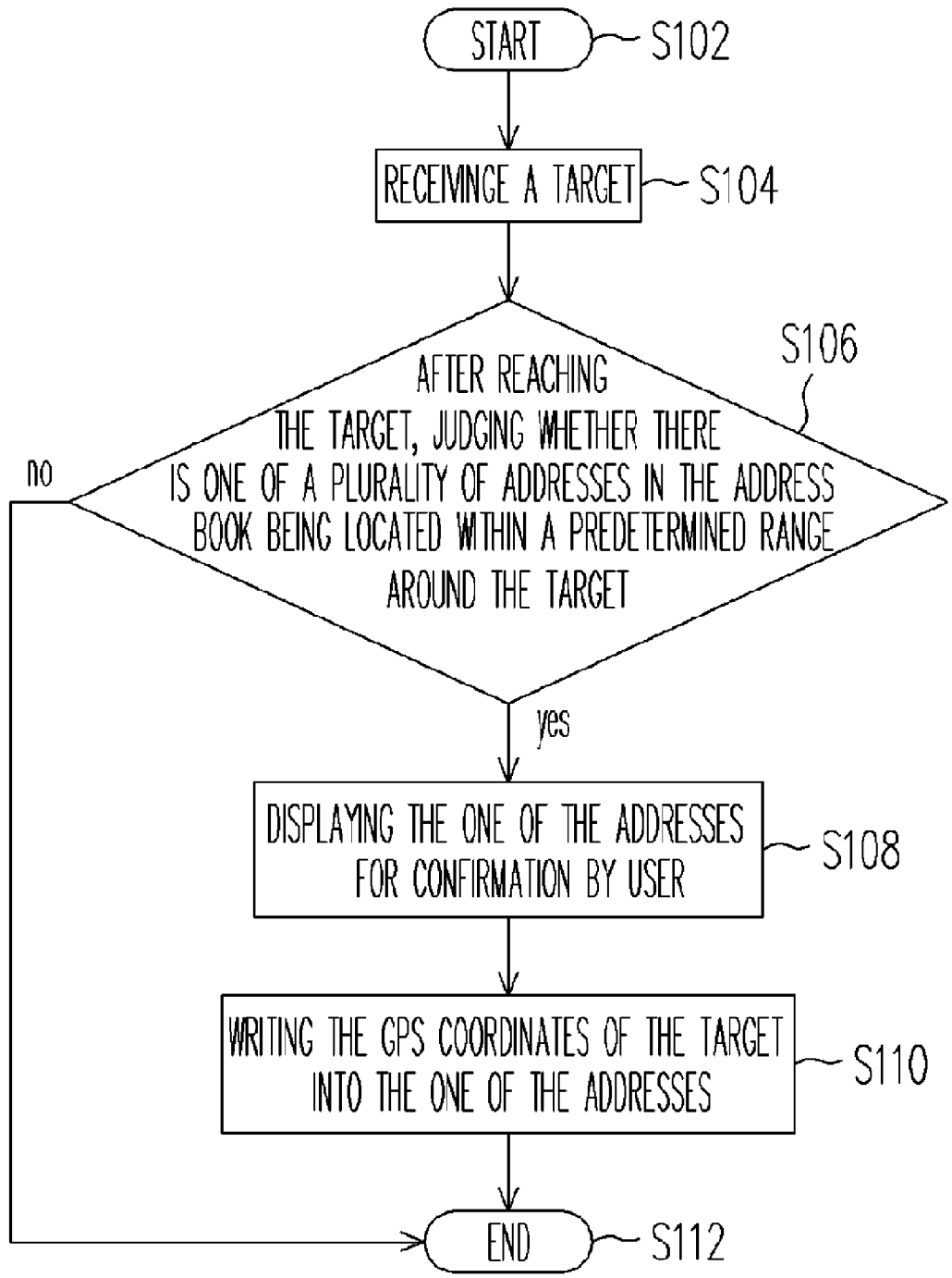
FIG. 1 is a flow chart for illustrating a method for auto-writing into an address book according to an embodiment of the invention.

Referring to FIG. 1, it is a flow chart for illustrating a method for auto-writing into an address book according to an embodiment of the invention. The method for auto-writing into an address book is adapted for electronic apparatuses having navigation functions. Those who are skilled in the arts may understand what the electronic apparatuses can be, but not limit to be a smart phone, a PDA or a cellular phone.

According to an embodiment of the invention, the method for auto-writing into an address book is to be illustrated in the following descriptions. The navigation device is started at step S102; and at step S104, the user of the navigation device inputs a start position and a target position, and setting an optimal or shortest path therebetween, whereby the navigation device will store the data of the start position and the target position in a register of the navigation device after the navigation device receiving them.

Then, at step S106, after the user reaching the target position, the navigation device calls the address book (as shown in FIG. 2) of the navigation device, and judges whether or not there is one of a plurality of addresses in the address book being located within a predetermined range around the target according to the address data of the address book.

Herein, the criteria of the navigation device for judging are based on whether the street name or even the house number of the target matches the street name or even the house number of the target recorded in the address book. Hence, it can be known whether or not the person to be found is located in predetermined range around the target.

According to an embodiment of the invention, the foregoing predetermined range for example can be set as default by the manufacturer or set by the user.

Again referring to FIG. 1, if it is judged that there is one of the addresses in the address book within a predetermined range around the target position, then at step S108 one of the addresses is to be displayed for confirmation by the user; otherwise, is it is judged that there is no any address in the address book within the predetermined range around the target position. Then, there is no address to be displayed for the user to confirm and jumps to step S112 for ending the steps;

Following step S108, after the displayed address is confirmed by the user, the navigation device writes the global satellite positioning coordinates of the target position into a user-confirmed address column (GPS coordinate column shown in FIG. 3) at step S110.

According to an aspect of the embodiment, what the address book of the navigation device recorded are basic information of the contact people, the basic information for example includes names, phone numbers and E-mail addresses.

In summary, the method for auto-writing into an address book of the invention is adapted for auto-writing the global satellite positioning coordinates of the target position into an address book, wherein not only the complicate work of manually recording in conventional technology can be avoided, but also the correctness of recording can be guaranteed.

It should be noted that specific embodiments of, and examples for, the invention are described herein for illustrative purposes, various equivalent modifications are possible within the scope of the invention, as those skilled in the relevant art will recognize that modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. A method for auto-writing into an address book, comprising the steps of:
   receiving a target, set by a user;
   judging whether having one of a plurality of addresses in the address book being located within a predetermined range around the target;
   if having one of the addresses in the address book located within the predetermined range around the target, displaying the one of the addresses for the user confirmation; and
   writing a global satellite positioning coordinates of the target into one of the addresses after a user confirmation.

2. The method for auto-writing into an adress book according claim 1, wherein if it is jidged that no any address of the address book is within the predetermoned range around the target, then no any address is displayed for the user confirmation.

3. The method for auto-writing into an address book according claim 1, wherein a street name is based to judge whether having one of the plurality if the addresses in the address book being located withjinthe predetermined range around.

4. The method for auto-writing into an address book according claim 3, wherein a house number is based to judge whether having one of a plurality of addresses in the address book being located wthin the predetermined range around the target.

5. The method for auto-writing into an address book according claim 1, wherein the address book of the navigation device includes a plurality of basic information corresponding to the addresses.

6. The method for auto-writing into an address book according claim 5, wherein the information include names of the addresses.

7. The method for auto-writing into an address book according claim 6, wherein the information further include phone numbers of the addresses.

8. The method for auto-writing into an address book according claim 7, wherein the information further include E-mail addresses of the addresses.

9. A method for auto-writing into an address book of an electronic device with a GPS (Global Positioning System), comprising the steps of;
   determining a target;
   judging whether at least one of a plurality of addresses in the address book being located by the GPS within a predetermined range around the target;
   displaying said one of the addresses if said one of the addresses being located within the predetermined range; and
   writing a global satellite positioning coordinates of the target into said one of the addresses.

10. The method For auto-writing into an address book according claim 9, wherein if it is judged that no any address of the address book is within the predetermined range around the target, then no any address is displayed for the user confirmation.

11. The method for auto-writing into an address hook according claim 9, wherein a street name is based to judge whether having one of a plurality of addresses in the address book being located within the predetermined range around.

12. The method for auto-writing into an address book according claim 11, wherein a house number is based to judge whether having one of a plurality of addresses in the address book being located within the predetermined range around the target.

13. The method for auto-writing into an address book according claim 9, wherein the address book of the navigation device includes a plurality of basic information corresponding to the addresses.

14. The method for auto-writing into an address book according claim 13, wherein the information include names of the addresses.

15. The method for auto-writing into an address book according claim 14, wherein the information further include phone numbers of the addresses.

16. The method for auto-writing into an address book according claim 15, wherein the information further include E-mail addresses of the addresses.

* * * * *